US011443259B2

(12) United States Patent
Carbonell et al.

(10) Patent No.: US 11,443,259 B2
(45) Date of Patent: Sep. 13, 2022

(54) AUTOMATIC FLOOR-LEVEL RETAIL OPERATION DECISIONS USING VIDEO ANALYTICS

(71) Applicant: DoorDash, Inc., San Francisco, CA (US)

(72) Inventors: Lee A. Carbonell, Flower Mound, TX (US); Tsz S. Cheng, Grand Prairie, TX (US); Jeffrey L. Edgington, Fort Worth, TX (US); Pandian Mariadoss, Allen, TX (US)

(73) Assignee: DoorDash, Inc., San Francisco, CA (US)

( * ) Notice: Subject to any disclaimer, the term of this patent is extended or adjusted under 35 U.S.C. 154(b) by 153 days.

(21) Appl. No.: 16/055,131

(22) Filed: Aug. 5, 2018

(65) Prior Publication Data

US 2018/0349832 A1  Dec. 6, 2018

Related U.S. Application Data

(63) Continuation of application No. 14/149,384, filed on Jan. 7, 2014, now Pat. No. 10,043,143.

(51) Int. Cl.
*G06Q 10/06* (2012.01)
*H04N 7/18* (2006.01)

(52) U.S. Cl.
CPC ....... *G06Q 10/063118* (2013.01); *H04N 7/18* (2013.01)

(58) Field of Classification Search
CPC .... G06Q 10/063118; H04N 7/18; G06N 5/04; Y04S 10/54

USPC ........ 705/7.17, 7.26; 348/143, 159; 382/103
See application file for complete search history.

(56) References Cited

U.S. PATENT DOCUMENTS

| 8,175,925 | B1 * | 5/2012 | Rouaix | G06Q 20/203 |
| | | | | 705/22 |
| 8,325,036 | B1 * | 12/2012 | Fuhr | G06Q 10/087 |
| | | | | 340/5.92 |
| 9,041,508 | B2 * | 5/2015 | Glickman | G06Q 10/087 |
| | | | | 200/61.61 |

(Continued)

OTHER PUBLICATIONS

U.S. Appl. No. 14/149,384, Non-Final Office Action, dated Nov. 10, 2016, 22 pg.

(Continued)

*Primary Examiner* — Folashade Anderson
(74) *Attorney, Agent, or Firm* — Polsinelli PC (57) ABSTRACT

A floor operations automation system can include an intelligent video module, profiles, decision rules, and a decision module. The intelligent video module can be configured to generate video analytics data from video captured by video cameras within a retail location. The profiles can contain data that represents a business practice or policy of the retail location and/or user-specified preferences for decision-related variables. The decision rules can express actions to be performed in response to predefined conditions within the retail location. The decision module can be configured to decide upon action to be performed, based upon the video analytics data, the profiles, and the decision rules. The decision can be made without direct input from a human agent of the retail location. The actions can affect a business system and/or a human agent associated with the retail location.

9 Claims, 5 Drawing Sheets

(56) References Cited

U.S. PATENT DOCUMENTS

| | | |
|---|---|---|
| 9,071,807 B2 | 6/2015 | Billau |
| 9,429,821 B2* | 8/2016 | Cury .................. G03B 17/04 |
| 10,043,143 B2 | 8/2018 | Carbonell et al. |
| 2001/0055417 A1 | 12/2001 | Vilella |
| 2002/0143672 A1 | 10/2002 | Sawasaki |
| 2003/0131057 A1 | 7/2003 | Basson et al. |
| 2004/0028258 A1 | 2/2004 | Naimark |
| 2004/0084527 A1* | 5/2004 | Bong ................. G06Q 10/087 |
| | | 235/385 |
| 2005/0268109 A1 | 12/2005 | McIntosh |
| 2007/0233788 A1 | 10/2007 | Bender et al. |
| 2008/0159634 A1 | 7/2008 | Sharma |
| 2008/0255968 A1 | 10/2008 | Heinrichs |
| 2008/0274757 A1* | 11/2008 | Lovell .................... H04W 4/04 |
| | | 455/466 |
| 2008/0288601 A1 | 11/2008 | Keohane et al. |
| 2009/0059270 A1 | 3/2009 | Opalach |
| 2009/0060349 A1 | 3/2009 | Linaker |
| 2009/0063307 A1* | 3/2009 | Groenovelt .......... G06Q 10/087 |
| | | 705/28 |
| 2009/0317002 A1* | 12/2009 | Dein .................. A61B 19/0256 |
| | | 382/224 |
| 2010/0007738 A1 | 1/2010 | Lehnert |
| 2011/0025847 A1 | 2/2011 | Park |
| 2011/0052001 A1* | 3/2011 | Tan ...................... G06Q 10/08 |
| | | 382/103 |
| 2011/0252109 A1 | 10/2011 | Steele et al. |
| 2013/0182114 A1* | 7/2013 | Zhang ..................... H04N 7/18 |
| | | 348/150 |
| 2014/0344118 A1* | 11/2014 | Parpia ................. G06Q 10/087 |
| | | 705/28 |
| 2015/0029339 A1 | 1/2015 | Kobres |
| 2015/0124088 A1* | 5/2015 | Vera ................. G08B 13/19632 |
| | | 348/143 |
| 2015/0193723 A1 | 7/2015 | Carbonell et al. |
| 2018/0372766 A1* | 12/2018 | Bryant ............. G01N 35/00732 |

OTHER PUBLICATIONS

U.S. Appl. No. 14/149,384, Non-Final Office Action, dated May 18, 2017, 13 pg.

U.S. Appl. No. 14/149,384, Final Office Action, dated Nov. 30, 2017, 29 pg.

U.S. Appl. No. 14/149,384, Notice of Allowance, dated Mar. 28, 2018, 9 pg.

\* cited by examiner

AUTOMATIC FLOOR-LEVEL RETAIL OPERATION DECISIONS USING VIDEO ANALYTICS

BACKGROUND

The present invention relates to the field of business automation and, more particularly, to automating floor-level retail operation decisions using video analytics.

Technology has improved a variety of processes in the retail sector. However, many tasks are still performed manually that today's technological advances are able to automate. For example, in a typical retail location (e.g., grocery store, department store, etc.), an employee is still required to physically walk to an area (e.g., shelf, display, storeroom, etc.) in order to check the availability or price of an item.

Video analytics technology is more than capable of performing this task. However, conventional video analysis systems still require employees for control and decision-making tasks, which does improve the efficiency of the retail business model. Further, the need for human decision-making in these systems leads to inconsistent decisions and are dependent on that person's expertise.

BRIEF SUMMARY

One aspect of the present invention can include a floor operations automation system. Such a system can include an intelligent video module, profiles, decision rules, and a decision module. The intelligent video module can be configured to generate video analytics data from video captured by video cameras within a retail location. The profiles can contain data that represents a business practice or policy of the retail location and/or user-specified preferences for decision-related variables. The decision rules can express actions to be performed in response to predefined conditions within the retail location. The decision module can be configured to decide upon action to be performed, based upon the video analytics data, the profiles, and the decision rules. The decision can be made without direct input from a human agent of the retail location. The actions can affect a business system and/or a human agent associated with the retail location.

Another aspect of the present invention can include a method for automating floor operations of a retail location. Such a method can begin with the receiving of video analytics data pertaining to a defined area of a retail location by a decision module of a floor operations automation system. The video analytics data can be provided by an intelligent video system having a plurality of video cameras within the retail location. The received video analytics data and/or a log that archives decisions and video analytics data can be analyzed. Based upon said analysis, at least one action can be automatically decided upon. The decision can be made utilizing decision rules and predefined profiles. The predefined profiles can express preferences for decision-related variables and/or the business practices or policies of the retail location. Without the floor operations automation system, the decision can vary based upon an expertise of a human agent associated with the retail location. A notification can be conveyed to a designated entity to perform the actions. The designated entity can be a business system associated with the retail location and/or a human agent.

Yet another aspect of the present invention can include a computer program product that includes a computer readable storage medium having embedded computer usable program code. The computer usable program code can be configured to receive location data for a mobile device. The computer usable program code can be configured to receive video analytics data pertaining to a defined area of a retail location. The video analytics data can be provided by an intelligent video system having a plurality of video cameras within the retail location. The computer usable program code can be configured to analyze the received video analytics data and/or a log that archives decisions and video analytics data. The computer usable program code can be configured to, based upon said analysis, automatically decide upon actions to be performed. The decision can be made utilizing a decision rules and predefined profiles. The predefined profiles can express preferences for decision-related variables and/or business practices or policies of the retail location. Otherwise, the decision of the actions can vary based upon an expertise of a human agent associated with the retail location. The computer usable program code can be configured to convey a notification to a designated entity to perform the actions. The designated entity can be a business system associated with the retail location and/or a human agent.

DETAILED DESCRIPTION

The present invention discloses a solution for automating a variety of manual tasks in a retail location using video analytics. A floor operations automation system can utilize a decision module to analyze video analytics data for an area of the retail location. Based on the analysis, the decision module can determine one or more actions that need to be taken to keep the retail location functioning efficiently and safely. Notifications can be sent to the appropriate personnel and/or business systems, instructing them on the necessary actions to be performed. The decisions can be recorded for later analysis.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
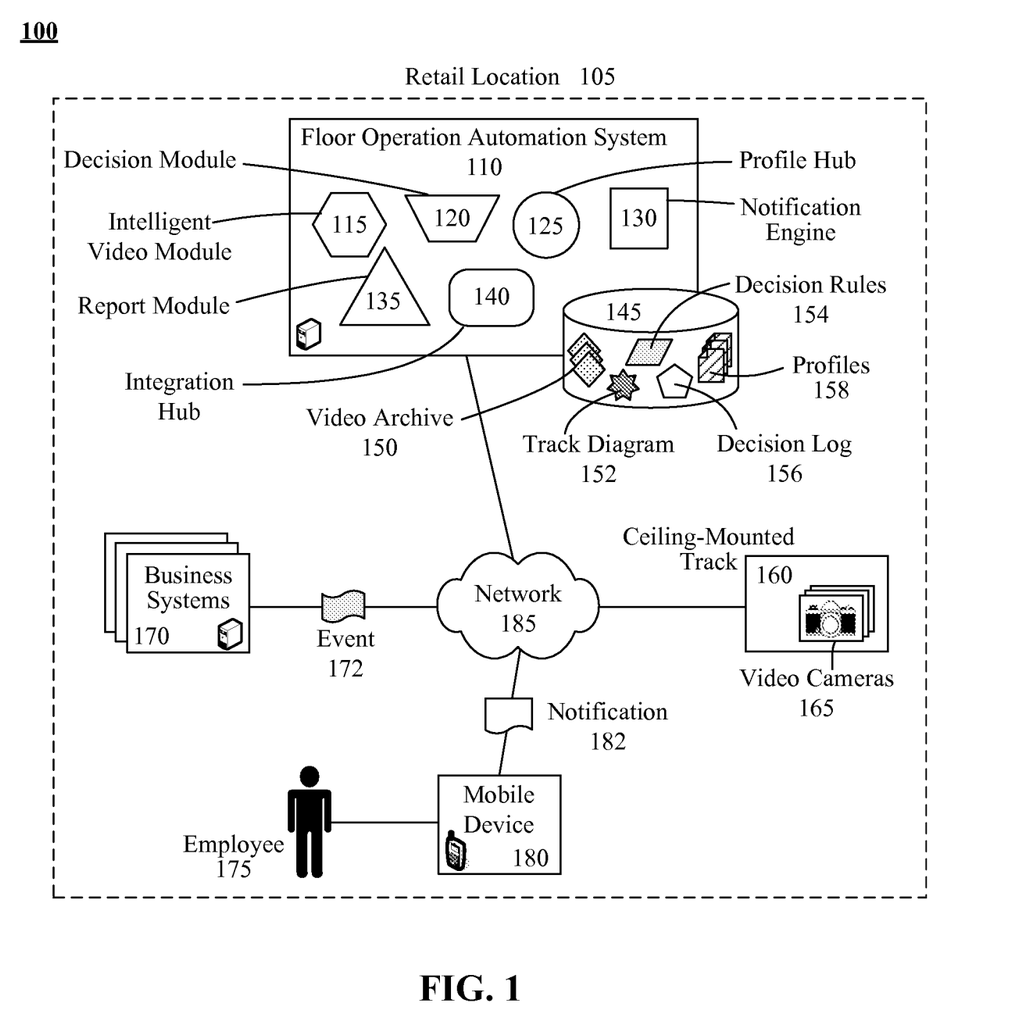
FIG. 1 is a schematic diagram illustrating a system for utilizing the floor operations automation system in a retail location in accordance with embodiments of the inventive arrangements disclosed herein.

FIG. 1 is a schematic diagram illustrating a system 100 for utilizing the floor operations automation system 110 in a retail location 105 in accordance with embodiments of the inventive arrangements disclosed herein. In system 100, the floor operations automation system 110 can be a centralized computer system, hardware and/or software, configured to automate manual tasks performed on the floor of retail location 105 using video analytics.

For example, the floor operations automation system 110 can determine when to call additional cashiers to their registers based upon current video of the check-out lines.

The floor operations automation system 110 can include components like an intelligent video module 115, a decision module 120, a profile hub 125, a notification engine 130, a report module 135, an integration hub 140, and a data store 145 to house related data. In another contemplated embodiment, the floor operations automation system 110 can be located external to the retail location 105, communicating with elements local to the retail location 105 via a designated communications pathway over one or more networks 185.

The intelligent video module 115 can represent the component of the floor operations automation system 110 that captures and analyzes video of the retail location 105. The intelligent video module 115 can include multiple video cameras 165 that can be moved around a track 160 mounted to the ceiling of the retail location 105. Video captured by the video cameras 165 can be stored in a video archive 150.

The video cameras 165 can be of appropriate specifications for the specific implementation of the floor operations automation system 110. Particularly, the video cameras 165 can include functionality such as zoom and position adjustment (e.g., rotating, tilting, etc.) to provide multiple views and levels of magnification. The video cameras 165 can also be capable of coupling to the ceiling-mounted track 160.

The video cameras 165 used by the intelligent video module 115 can be separate to any other cameras used by other business systems 170 like a surveillance system. Further, the intelligent video module 115 can be configured to interact with an existing surveillance system to receive video for analysis. In another embodiment, the floor operations automation system 110 can be configured to take on surveillance and security tasks. In such an embodiment, tasking of the video cameras 165 between surveillance and operations can be left to discretion of the retail location 105.

The ceiling-mounted track 160 can be affixed to the ceiling in such a manner as to provide a level and stable foundation for the video cameras 165, whether stationary or while moving. The ceiling-mounted track 160 can be arranged on the ceiling in a variety of patterns, depending upon the size, shape, and needs of the retail location 105.

The intelligent video module 115 can indicate the locations of the video cameras 165 on the ceiling-mounted track 160 using the track diagram 152. The track diagram 152 can be an electronic representation of the ceiling-mounted track 160. In addition to the location of the video cameras 165, the track diagram 152 can also be used to indicate routes being traversed by the video cameras 165 as well as any other areas of concern.

The track diagram 152 can be geographically accurate for the retail location 105 in order to be used in conjunction with a layout or planogram. For example, the intelligent video module 115 can cross-reference the track diagram 152 against the layout of the retail location 105 to determine which video camera 165 is closest to a specific item.

The intelligent video module 115 can utilize techniques taught in the existing art, such as U.S. Pat. No. 8,325,036 and U.S. Patent applications 20090089108 and 20080018738. It should be noted that the present disclosure goes beyond the video analytic techniques taught in this art, and, the video analytics can simply be used as input for the decision module 120.

The decision module 120 can be the heart of the floor operations automation system 110; utilizing video analytics data provided by the intelligent video module 115, decision rules 154, and applicable profiles 158 to decide upon actions to be taken by employees 175 and/or business systems 170 of the retail location 105. Decisions made by the decision module 120 can be recorded in a decision log 156.

The decision rules 154 can represent configurable preferences for the decision-making process employed by the decision module 120. The profiles 158 can be electronic representations, interpretable by the decision module 120, of the business processes, policies, and/or procedures established by the governance of the retail location 105. For example, a profile 158 can define the minimum amount of an item present on the shelf that is considered as stocked. Analysis of the shelf indicating a quantity less than the minimum amount can cause the decision module 120 to notify an employee 175 for restock.

The profiles 158 can be maintained by the profile hub 125. The profile hub 125 can be particularly beneficial when the retail location 105 is part of a larger enterprise computing system. In such a case, the profile hub 125 can ensure that the data of the profiles 158 reflect changes to personnel, policy, or procedures made at a level above the retail location 105. Such changes can be captured in a business system 170 that the profile hub 125 can communicate with over the network 185. In a smaller scale setting, the profile hub 125 can simply represent the management functionality for manually creating and updating the profiles 158.

Business systems 170 can represent other computer systems used by the retail location 105 and/or the larger enterprise that it is a part. The types of business systems 170 used can vary by implementation and retail location 105. Examples of business systems 170 can include, but are not limited to, a security system, a surveillance system, a point-of-sale (POS) system, an inventory management system, a Web application (i.e., Web site for online shopping), a radio frequency identification (RFID) system, and the like.

Additionally, the business systems 170 can be configured to trigger events 172 when predetermined conditions are met. An event 172 can be an electronic message containing data pertinent to the triggering conditions and/or other relevant data. The decision module 120 can utilize an event 172 as input to its decision-making process.

For example, a security system 170 can issue an event 172 that a glass-break sensor has been tripped. Based on this event 172, the decision module 120 can instruct the intelligent video module 115 to move a video camera 165 to the appropriate window to capture video. Depending on the analysis of that video, the decision module 120 can decide upon other actions, such as notifying the authorities or the manager.

The notification engine 130 can be the component used by the decision module 120 to create notifications 182 like those discussed in the previous examples. The notification 182 can be sent to the mobile device 180 of an employee 175 and/or another business system 170. The notification 182 can take a variety of electronic formats and utilize commensurate transmission mechanisms. For example, the floor operations automation system 110 can send the notification 182 as a text message using an in-store network 185. Alternately, the notification 182 can be an email message sent using the Internet and/or company network 185.

The mobile device 180 can represent a variety of electronic devices capable of receiving and presenting notifications 182 over the network 185. The mobile device 180 can be the property of the retail location 105, loaned to the employee 175 for work tasks, or the mobile device 180 can be a device of the employee's 175.

The report module 135 can be a component of the floor operations automation system 110 configured to generate a variety of reports from the decision log 156, video archive 150, and/or profiles 158. Additionally, the report module 135 can request data from other business systems 170 to create a report.

The integration hub 140 can be component of the floor operations automation system 110 configured to handle communications between the floor operations automation system 110 and the other external systems like business systems 170. The integration hub 140 can be responsible for translating messages into the correct format for the receiving system as well as establishing communication pathways over the network 185.

As used herein, presented data store 145 can be a physical or virtual storage space configured to store digital information. Data store 145 can be physically implemented within any type of hardware including, but not limited to, a magnetic disk, an optical disk, a semiconductor memory, a digitally encoded plastic memory, a holographic memory, or any other recording medium. Data store 145 can be a stand-alone storage unit as well as a storage unit formed from a plurality of physical devices. Additionally, information can be stored within data store 145 in a variety of manners. For example, information can be stored within a database structure or can be stored within one or more files of a file storage system, where each file may or may not be indexed for information searching purposes. Further, data store 145 can utilize one or more encryption mechanisms to protect stored information from unauthorized access.

Network 185 can include any hardware/software/and firmware necessary to convey data encoded within carrier waves. Data can be contained within analog or digital signals and conveyed though data or voice channels. Network 185 can include local components and data pathways necessary for communications to be exchanged among computing device components and between integrated device components and peripheral devices. Network 185 can also include network equipment, such as routers, data lines, hubs, and intermediary servers which together form a data network, such as the Internet. Network 185 can also include circuit-based communication components and mobile communication components, such as telephony switches, modems, cellular communication towers, and the like. Network 185 can include line based and/or wireless communication pathways.

Figure 2:
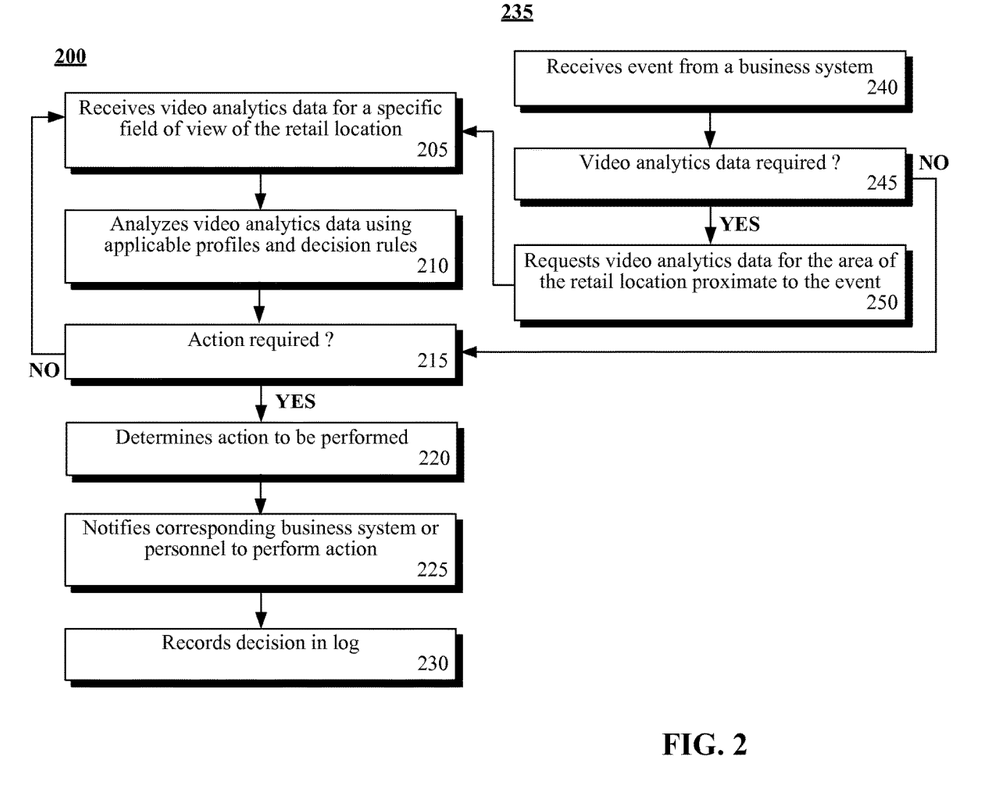
FIG. 2 is a flowchart of a method describing the general operation of the floor operations automation system in accordance with embodiments of the inventive arrangements disclosed herein.

FIG. 2 is a flowchart of a method 200 describing the general operation of the floor operations automation system in accordance with embodiments of the inventive arrangements disclosed herein. Method 200 can be performed within the context of system 100.

Method 200 can begin in step 205 where the floor operations automation system can receive video analytics data for a specific field of view of the retail location. The video analytics data can be generated by the intelligent video module having performed various video analysis operations upon video captured of the specific field of view. The video analytics data can be passed to the decision module as metadata.

The video analytics data can be analyzed using the applicable profiles and decision rules by the decision module in step 210. In step 215, the decision module can determine if action is required based upon its analysis of the video analytics data. When no action is required, flow of method 200 can return to step 205 to repeat with video analytics data of another area of the retail location.

When it is determined that action is required, the decision module can determine the action or actions to be performed in step 220. In step 225, the decision module can invoke the notification engine to notify the corresponding business system or personnel to perform the determined action. The decision module can then record the decision in its log in step 230.

Although method 200 can represent the routine operation of the floor operations automation system, it can have an alternate point of entry 235. Instead, step 240 can be performed where the floor operations automation system receives an event from a business system. The decision module can determine if handling the event requires additional video analytics data in step 245.

When the event does not require additional video analytics data, the alternate entry point can flow to step 215 of method 200 for further handling. When the event requires additional video analytics data, the video analytics data can be requested for the area of the retail location proximate to the event in step 250. From step 250, method 200 can start at step 205 with the receipt of the requested video analytics data.

Figure 3:
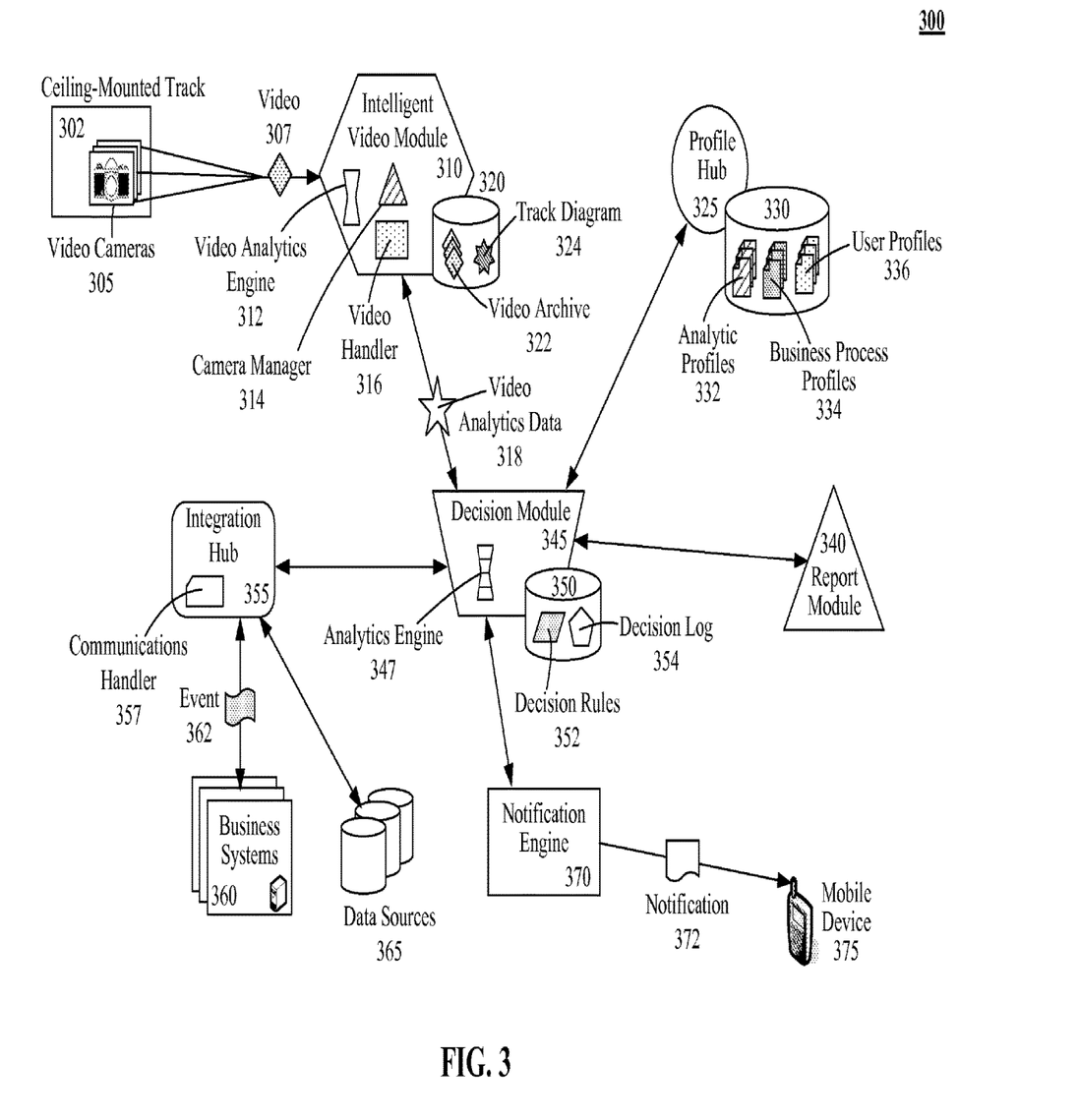
FIG. 3 is a functional diagram detailing the components and interactions of the floor operations automation system in accordance with an embodiment of the inventive arrangements disclosed herein.

FIG. 3 is a functional diagram 300 detailing the components and interactions of the floor operations automation system in accordance with embodiments of the inventive arrangements disclosed herein. The functional diagram 300 can be utilized within the context of system 100 and/or method 200.

The video cameras 305 can move about the ceiling-mounted 302 capturing video 307 that is sent to the intelligent video module 310. The intelligent video module 310 can include a video analytics engine 312, a camera manager 314, a video handler 316, and a data store 320 containing the video archive 322 and track diagram 324.

The camera manager 314 can monitor the locations of the video cameras 305 on the ceiling-mounted track 302 using the track diagram 324. The camera manager 314 can be responsible for determining which video camera 305 to assign to handle a request from the decision module 345.

The video handler 316 can catalog the received video 307 in the video archive 322, adding additional tag data as necessary. The video analytics engine 312 can process the video 307 to produce video analytics data 318. The video analytics data 318 can be expression of the video 307 that is interpretable by the decision module 345.

The decision module 345 can receive the video analytics data 318 from the intelligent video module 310. The decision module 345 can include an analytics engine 347 and data store containing decision rules 352 and a decision long 354. The decision module 345 can perform a cursory analysis to determine which decision rules 352 to retrieve and which profiles 332, 334, and/or 336 to request from the profile hub 325.

The profile hub 325 can maintain a data store 330 containing analytics profiles 332, business process profiles 334, and user profiles 336. The user profiles 336 can contain specific data regarding employees, such as medical conditions, security privileges, access levels, and the like.

The analytics profiles 332 can define parameters to be used for the analysis of different types of situations and/or analysis. For example, an analytics profile 332 can express the differences in the camera positioning for assessing the quantity of an item on the different shelves of a display.

The business process profiles 334 can express the policies and procedures of the company operating the retail location. For example, a business process profile 334 can indicate that a new check-out register is to be opened when the length of each open register reaches four customers.

The profile hub 325 can query its library of profiles 332, 334, and 336 and return the results to the decision module 345. The decision module 345 can then process the received video analytics data 318, profiles 332, 334, and 336, and decision rules 352 using the analytics engine 347 to identify what actions, if any, should be performed within the retail location to keep business running smoothly.

Should the decision module 345 require additional information from another source, the decision module 345 can send its request using the integration hub 355. The integration hub 355 can include a communications handler 357 to translate the request into the format appropriate for the receiving business system 360 or data source 365.

A data source 365 can represent a service or data repository having access to the data required by the decision module 345. For example, if the decision module 345 needs the weather forecast for its area, the integration hub 355 can submit the request to an online weather application 365.

The integration hub 355 can also receive events 362 from business systems 360. A received event 365 can be reformatted, if necessary, in order to be processed by the decision module 345.

The actions comprising the decision made by the decision module 345 can be issued by the notification engine 370 as notifications 372. The notification 372 can be sent to the mobile device 375 or other computing device of an employee or a business system 360 for execution.

The report module 340 interacts with the decision module 345 to request data for reports. Further, it should be noted that the report module 340, profile hub 325, and notification engine 370 can also interact with the integration hub 355 to communicate with other business systems 360; these connections can be omitted from the functional diagram 300 for the sake of clarity.

As used herein, presented data stores 320, 330, and 350 and data sources 365 can be a physical or virtual storage space configured to store digital information. Data stores 320, 330, and 350 and data sources 365 can be physically implemented within any type of hardware including, but not limited to, a magnetic disk, an optical disk, a semiconductor memory, a digitally encoded plastic memory, a holographic memory, or any other recording medium. Data stores 320, 330, and 350 and data sources 365 can be a stand-alone storage unit as well as a storage unit formed from a plurality of physical devices. Additionally, information can be stored within data stores 320, 330, and 350 and data sources 365 in a variety of manners. For example, information can be stored within a database structure or can be stored within one or more files of a file storage system, where each file may or may not be indexed for information searching purposes. Further, data stores 320, 330, and 350 and data sources 365 can utilize one or more encryption mechanisms to protect stored information from unauthorized access.

Figure 4:
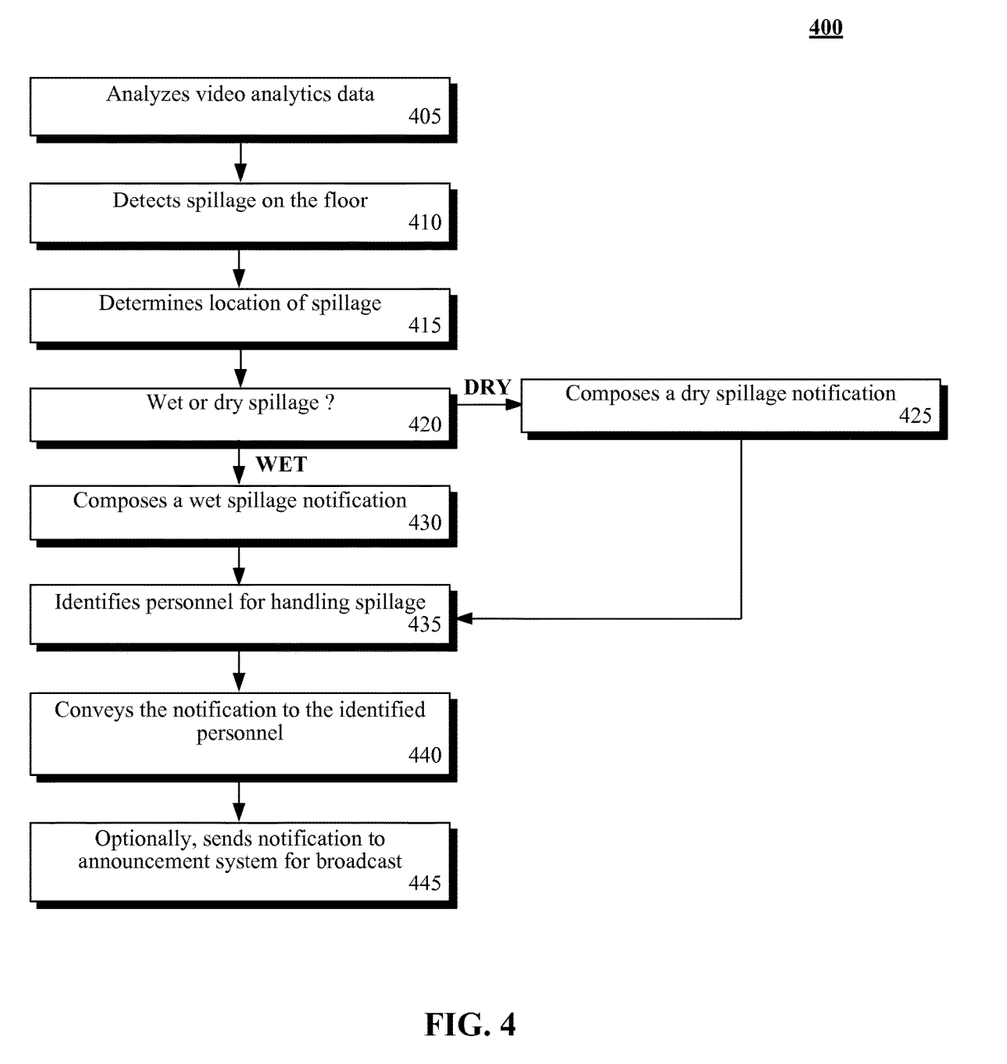
FIG. 4 is a flowchart of a method describing an example use case of the floor operations automation system in accordance with embodiments of the inventive arrangements disclosed herein.

FIG. 4 is a flowchart of a method 400 describing an example use case of the floor operations automation system in accordance with embodiments of the inventive arrangements disclosed herein. Method 400 can be performed within the context of system 100.

Method 400 can begin in step 405 wherein the video analytics data is analyzed. Based upon the analysis, spillage on the floor can be detected in step 410. In step 415, the location of the spillage can be determined. The determination in step 415 can be made based upon the position of the camera within the retail location as well as any other visual indicators (e.g., an aisle sign).

In step 420, additional analysis can determine if the spillage is wet or dry. When the spillage is determined to be dry, a dry spillage notification can be composed in step 425. When the spillage is determined to be wet, step 430 can be performed where a wet spillage notification can be composed.

Upon completion of step 420 or step 425, the personnel required to handle the spillage can be identified in step 435. In step 440, the notification can be conveyed to the identified personnel. Optionally, the notification can be sent to an announcement system for broadcast in step 445.

Thus, instead of relying upon employees to notice spillage, the floor operations automation system can detect the spillage near-immediately and direct the appropriate personnel to attend to the situation before someone is injured.

Figure 5:
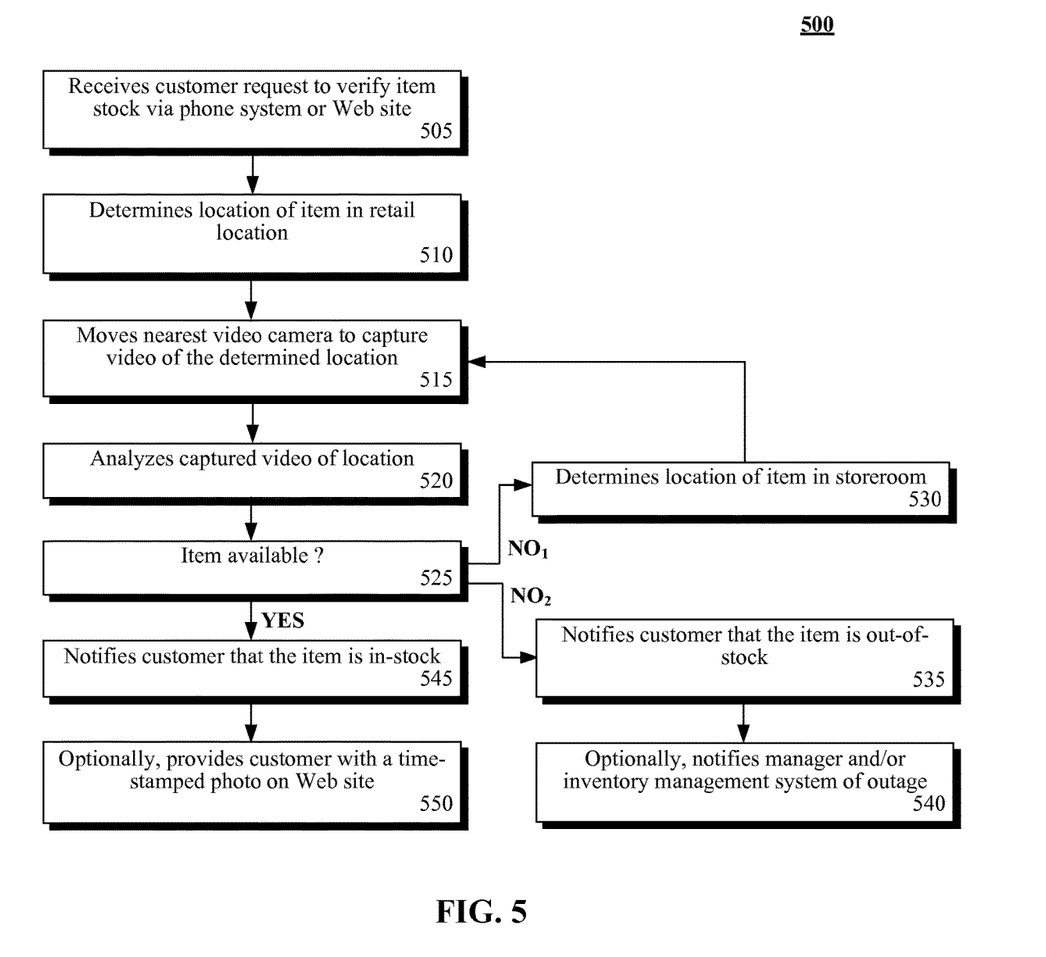
FIG. 5 is a flowchart of a method describing an example use case of the floor operations automation system with an event as input in accordance with embodiments of the inventive arrangements disclosed herein.

FIG. 5 is a flowchart of a method 500 describing an example use case of the floor operations automation system with an event as input in accordance with embodiments of the inventive arrangements disclosed herein. Method 500 can be performed within the context of system 100.

Method 500 can begin in step 505 where the floor operations automation system receives an event (input) from another business system of the retail location; in this example, the floor operations automation system can receive a customer request to verify the stock of an item. The customer request can be made via a phone system tree or a Web site for the retail location. Alternately, an employee can manually submit the request into the floor operations automation system.

The location of the item in the retail location can be determined in step 510. In step 515, the video camera nearest to the determined location can be moved along the ceiling-mounted track to capture video of the location. The captured video of the location can be analyzed in step 520.

Based on the analysis, the availability of the item can be determined in step 525. When the item is determined to not be available and the capabilities of the floor operations automation system cover the storeroom or inventory area, step 530 can be performed where the location of the item in the storeroom can be determined. Flow of method 500 can return to step 515 to repeat the process of capturing and analyzing video of the item in the storeroom.

When the item is determined to not be available in the retail location and the storeroom, step 535 can be performed where the customer can be notified that the item is out-of-stock. Step 535 can involve sending the notification to the appropriate business system which will convey the notification to the customer. Optionally, the manager and/or inventory management system can be notified of the item outage in step 540.

For step 535 and/or 540, additional processing of the notification may be necessary and can be performed by the notification engine, when properly configured, or the receiving business system.

For example, in the case of the phone system, the customer can expect to hear an audio response. The notification generated by the floor operations automation system can be textual in nature, and, therefore, require the use of a text-to-speech engine to produce an audio equivalent. The text-to-speech engine can be implemented as an auxiliary component of the notification engine, a service used by the notification engine or business system, or an auxiliary component of the business system.

When the item is available in the retail location, step 545 can be performed where the customer is notified that the item is in-stock. As with steps 535 and 540, step 545 can also require additional processing of the notification. Optionally, when the request was made using the retail location's or company's Web site, the customer can also be provided with a time-stamped photo of the item in step 550.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method performed within a floor operations automation system having a plurality of video cameras mounted to a ceiling mounted track located within a physical site, comprising:

receiving, as an event and by the automation system, a request to verify stock of an item;

determining, using the event and a profile associated with the item, a location of the item within the physical site;

directing, using a track diagram of the ceiling-mounted track and a planogram of the physical site, one of the plurality of cameras towards the location of the item;

obtaining video analytics data pertaining to the location of the item;

analyzing the video analytics data to determine a number of the items at the location;

comparing the number of items to a minimum number of items indicated within the profile; and forwarding, based upon the comparison, a time-stamped picture of the location to an initiator of the request to verify stock of the item.

2. The method of claim 1, further comprising:

issuing, based upon the comparison and the profile, a restock notice.

3. The method of claim 1, further comprising:

issuing, based upon the comparison, an out-of-stock notification to an initiator of the request to verify stock of the item.

4. A floor operations automation system, comprising:

a plurality of video cameras mounted to a ceiling mounted track located within a physical site; and a computer hardware system configured to perform:
   receiving, as an event, a request to verify stock of an item;
   determining, using the event and a profile associated with the item, a location of the item within the physical site;
   directing, using a track diagram of the ceiling-mounted track and a planogram of the physical site, one of the plurality of cameras towards the location of the item;
   obtaining video analytics data pertaining to the location of the item;
   analyzing the video analytics data to determine a number of the items at the location;
   comparing the number of items to a minimum number of items indicated within the profile; and
   forwarding, based upon the comparison, a time-stamped picture of the location to an initiator of the request to verify stock of the item.

5. The system of claim 4, wherein the computer hardware system is further configured to perform:

issuing, based upon the comparison and the profile, a restock notice.

6. The system of claim 4, wherein the computer hardware system is further configured to perform:

issuing, based upon the comparison, an out-of-stock notification to an initiator of the request to verify stock of the item.

7. A computer program product, comprising a computer readable hardware storage device having computer usable program code embodied therewith, the computer usable program code, which when executed by a floor operations automation system including a plurality of video cameras mounted to a ceiling mounted track located within a physical site; cause the floor operations automation system to perform:
   receiving, as an event, a request to verify stock of an item;
   determining, using the event and a profile associated with the item, a location of the item within the physical site;
   directing, using a track diagram of the ceiling-mounted track and a planogram of the physical site, one of the plurality of cameras towards the location of the item;
   obtaining video analytics data pertaining to the location of the item;
   analyzing the video analytics data to determine a number of the items at the location;
   comparing the number of items to a minimum number of items indicated within the profile; and
   forwarding, based upon the comparison, a time-stamped picture of the location to an initiator of the request to verify stock of the item.

8. The computer program product of claim 7, wherein the computer usable program code further causes the floor operations automation system to perform:

issuing, based upon the comparison and the profile, a restock notice.

9. The computer program product of claim 7, wherein the computer usable program code further causes the floor operations automation system to perform:

issuing, based upon the comparison, an out-of-stock notification to an initiator of the request to verify stock of the item.

* * * * *